(12) United States Patent
Le et al.

(10) Patent No.: US 9,931,964 B2
(45) Date of Patent: Apr. 3, 2018

(54) OCCUPANT WEIGHT AND HEIGHT ESTIMATION

(71) Applicant: Ford Global Technologies, LLC, Dearborn, MI (US)

(72) Inventors: Jialiang Le, Canton, MI (US); Manoharprasad K. Rao, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 40 days.

(21) Appl. No.: 14/741,575

(22) Filed: Jun. 17, 2015

(65) Prior Publication Data

US 2016/0368397 A1    Dec. 22, 2016

(51) Int. Cl.
| | | |
|---|---|---|
| *B60N 2/00* | (2006.01) | |
| *G01G 19/50* | (2006.01) | |
| *G07C 5/08* | (2006.01) | |
| *G01G 19/414* | (2006.01) | |
| *B60N 2/02* | (2006.01) | |
| *B60R 21/015* | (2006.01) | |

(Continued)

(52) U.S. Cl.
CPC ......... *B60N 2/002* (2013.01); *G01G 19/4142* (2013.01); *G01G 19/50* (2013.01); *G07C 5/08* (2013.01); *B60N 2/0252* (2013.01); *B60N 2/62* (2013.01); *B60N 2/66* (2013.01); *B60R 21/013* (2013.01); *B60R 21/015* (2013.01); *B60R 21/0152* (2014.10); *B60R 21/01552* (2014.10)

(58) Field of Classification Search
CPC ... B60N 2/62; B60N 2/66; B60N 2/64; B60N 2/48; B60N 2/68; B60N 2/2806; B60N 2/2821; B60N 2/26; B60N 2/28; B60N 2/0252; B60N 2/02; G06K 9/00832; G06K 9/00335; H04N 21/414; B60R 21/0152; B60R 21/239; B60R 21/276; B60R 21/013; B60R 21/16; B60R 21/015; B60R 21/207; B60R 21/01516; B60R 21/01556; B60R 16/037
See application file for complete search history.

(56) References Cited

U.S. PATENT DOCUMENTS

| | | |
|---|---|---|
| 5,626,359 A | 5/1997 | Steffens, Jr. et al. |
| 6,345,839 B1 | 2/2002 | Kuboki |
| (Continued) | | |

FOREIGN PATENT DOCUMENTS

| | | |
|---|---|---|
| CN | 103612632 A | 3/2014 |
| DE | 1020130211930 A1 | 6/2015 |
| (Continued) | | |

OTHER PUBLICATIONS

UK Search Report 15893P/GB; Appl No. GB1613252.4; dated Nov. 29, 2016 (5 pages).

(Continued)

*Primary Examiner* — Behrang Badii
(74) *Attorney, Agent, or Firm* — Frank A. MacKenzie; Bejin Bieneman PLC

(57) ABSTRACT

A vehicle classification system includes a processor programmed to determine a seated height and seated weight associated with a vehicle occupant. The processor is further programmed to assign a classification to the vehicle occupant based at least in part on a ratio of the seated weight to the seated height.

15 Claims, 5 Drawing Sheets

(51) Int. Cl.
*B60N 2/62* (2006.01)
*B60N 2/66* (2006.01)
*B60R 21/013* (2006.01)

(56) References Cited

U.S. PATENT DOCUMENTS

| | | | |
|---|---|---|---|
| 7,147,246 B2 * | 12/2006 | Breed | B60R 21/0152 280/735 |
| 7,370,883 B2 | 5/2008 | Basir et al. | |
| 7,740,096 B2 * | 6/2010 | Bothe | B60N 2/0252 180/268 |
| 7,762,582 B2 | 7/2010 | Breed | |
| 8,606,465 B2 | 12/2013 | Wang | |
| 9,308,882 B2 * | 4/2016 | Nagasawa | B60R 21/013 |
| 2002/0125050 A1 | 9/2002 | Breed et al. | |
| 2007/0083311 A1 | 4/2007 | Tabe | |
| 2008/0246318 A1 * | 10/2008 | Bothe | B60N 2/0252 297/217.3 |
| 2010/0121535 A1 | 5/2010 | Wang et al. | |
| 2014/0204193 A1 | 7/2014 | Zhang et al. | |
| 2014/0353048 A1 | 12/2014 | Kriger | |
| 2015/0321590 A1 * | 11/2015 | Mizoi | B60N 2/62 297/284.1 |

FOREIGN PATENT DOCUMENTS

| | | |
|---|---|---|
| EP | 1299269 | 10/2001 |
| EP | 2784456 | 3/2014 |
| JP | 2004338517 A | 12/2004 |
| JP | 4059258 B2 | 3/2008 |
| KR | 20130050680 | 5/2013 |
| WO | 0144026 A | 6/2001 |

OTHER PUBLICATIONS

Non-Final Office Action dated Feb. 9, 2017, U.S. Appl. No. 14/827,331.

* cited by examiner

OCCUPANT WEIGHT AND HEIGHT ESTIMATION

BACKGROUND

Occupant detection and classification systems use various metrics to detect and classify vehicle occupants. The metrics can be measured or based on a user input. Sometimes, the metrics relate to the occupant's size. For instance, an occupant detection system may determine whether an occupant is present in a vehicle based on a weight on the seat. Such systems can sometimes distinguish adult occupants from children, pets, or non-living objects.

DETAILED DESCRIPTION

Medical professionals use body mass index (BMI) to roughly evaluate a person's size relative to his or her height and weight. A person's BMI may indicate whether that person is underweight, at a normal weight, overweight, or obese. These same classifications may be used to tune certain vehicle subsystems such as a restraint system. BMI can be calculated from a person's standing weight and standing height. That information, however, is often unavailable to the vehicle unless voluntarily provided by the occupant. Even if it is voluntarily provided, a person's weight may change from time to time. Thus, simply requesting that vehicle occupants provide their heights and weights is not necessarily a reliable way to determine an occupant's height and weight.

One possible solution may have a vehicle classification system determine an occupant's BMI from his or her seated height and seated weight. An example classification system may includes a processor programmed to determine the seated height and seated weight associated with the occupant and assign a classification to the occupant based at least in part on a ratio of the seated weight to the seated height. The seated height may be a function of the vertical height adjusted by a seat angle. The seated weight may include a weight applied to the seat, therefore excluding the majority of the occupant's legs. The ratio of the seated weight to the seated height may be referred to as a seated body mass index or seated BMI. In some instances, the seated BMI may be a function of the ratio of the seated weight to the seated height squared.

The seated BMI may be related to the more traditional BMI used by medical professionals. Thus, the seated BMI may be used to determine whether a particular occupant is underweight, at a normal weight, overweight, or obese. Various vehicle subsystems may be tuned accordingly.

The elements shown may take many different forms and include multiple and/or alternate components and facilities. The example components illustrated are not intended to be limiting. Indeed, additional or alternative components and/or implementations may be used.

Figure 1:
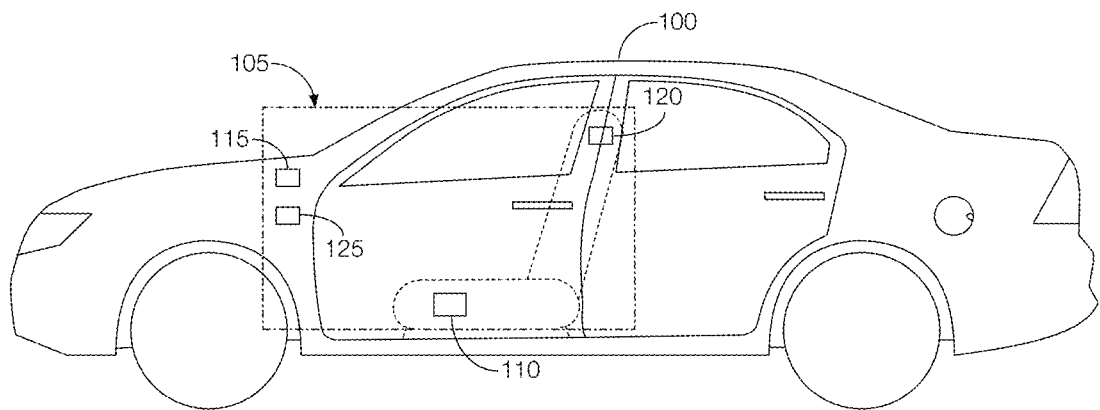
FIG. 1 illustrates an example vehicle with a classification system that can assign a classification to an occupant based on the occupant's seated weight and seated height.
Figure 2:
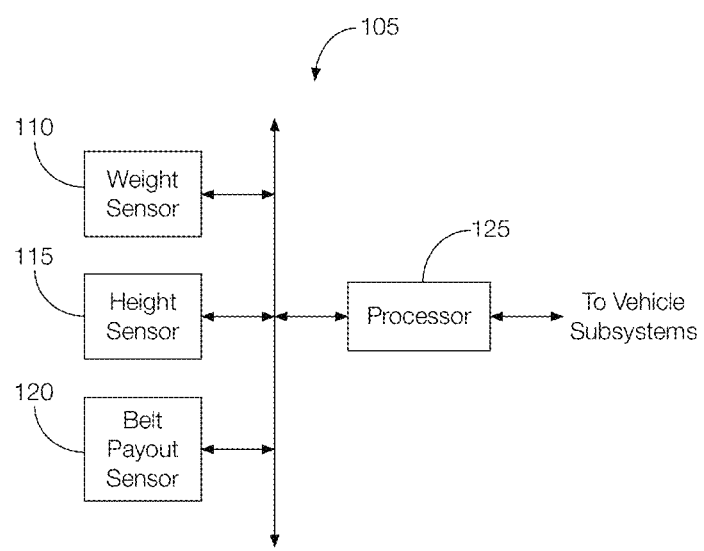
FIG. 2 is a block diagram of example components of the classification system of FIG. 1.

As illustrated in FIGS. 1 and 2, the host vehicle 100 includes an occupant classification system 105 that can classify occupants according to the occupant's size without requiring the occupant to provide his or her height and weight. The occupant classification system 105 may measure the occupant's seated height, measure the occupant's seated weight, determine a ratio of the occupant's seated weight to seated height, and assign a classification based, at least in part, on the ratio. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, as discussed below, the vehicle is an autonomous vehicle configured to operate in an autonomous (e.g., driverless) mode, a partially autonomous mode, and/or a non-autonomous mode.

The occupant classification system 105 may include a weight sensor 110, a height sensor 115, a belt payout sensor 120, and a processor 125.

The weight sensor 110 may include an electronic computing device programmed to measure a seated weight of the occupant. The weight sensor 110 may be embedded into a vehicle seat, such as the driver seat. In some possible approaches, the weight sensor 110 may be programmed to measure the amount of weight applied to the seat. This weight may be referred to as the "seated weight" since it represents the weight of the occupant while seated. The occupant's seated weight may be different from the occupant's standing weight since the seated weight may exclude the weight of the majority of the occupant's legs. The weight sensor 110 may be further programmed to output a seated weight signal representing the seated weight measured by the weight sensor 110.

The height sensor 115 may include an electronic computing device programmed to measure a seated height of the occupant. The seated height may include vertical height that includes a distance from, e.g., the top of the seat to a top of the occupant's head. The seated height, therefore, may be based on a difference between the height of the top of the occupant's head and the height of the top of the seat. The height of the top of the seat may be determined based on the height of the seat from the vehicle floor, a thickness of the seat, or both. The electronic computing device of the height sensor 115 may determine the seat angle from the input of a seatback angle sensor (not shown) incorporated into the seat back. The height of the top of the occupant's head may be determined by, e.g., a vision sensor, such as a camera, incorporated into the height sensor 115. The height sensor 115 may be programmed to measure or estimate the height of the top of the occupant's head by detecting, e.g., the height of the occupant's eye level. Because seat angle may affect the height of the top of the occupant's head, the height sensor 115 may be programmed to account for the seat angle and adjust the height of the top of the occupant's head according to the seat angle. The height sensor 115 may be programmed to output a seated height signal representing the seated height measured by the height sensor 115.

The belt payout sensor 120 may include an electronic computing device programmed to determine a seatbelt payout length. The seatbelt payout length may include the length of the seatbelt that is unraveled when the occupant is in the seat with the seatbelt buckled. The belt payout sensor 120 may be programmed to output a belt payout signal representing the length of the seatbelt payout.

The processor 125 may include an electronic computing device programmed to determine a classification for the occupant. The classification may be based on, e.g., the seated weight determined by the weight sensor 110, the seated height determined by the height sensor 115, and the length of the seatbelt payout determined by the belt payout sensor 120. For instance, the processor 125 may be programmed to receive the seated weight signal, the seated height signal, and the belt payout signal. In some possible implementations, the processor 125 may be programmed to determine a seated body mass index, which may be a function of the seated weight and seated height. For instance, the seated body mass index may be the ratio of the seated weight to seated height squared as shown in Equation (1), where seated weight is measured in kilograms and seated height is measured in meters.

$$BMI_{Seated} = f\left(\frac{\text{Seated Weight}}{\text{Seated Height}^2}\right) \qquad (1)$$

The processor 125 may be programmed to assign a classification to the occupant based on the seated BMI. Example classifications may include underweight, normal weight, overweight, or obese.

In some instances, the processor 125 may be programmed to consider the length of the seatbelt payout, as indicated by the belt payout signal, when assigning a classification to the occupant. That is, the length of the seatbelt payout may confirm the assigned classification (i.e., a larger belt payout length may indicate a larger occupant). Alternatively, the processor 125 may be programmed to adjust the classification according to the belt payout length. For instance, occupants with athletic builds may have a relatively high seated BMI but may not be as large as other people with the same weight and height. Thus, where the seated BMI indicates a larger occupant but the belt payout length suggests a smaller occupant, the processor 125 may be programmed to classify the occupant as having a normal weight.

The processor 125 may be programmed to tune one or more vehicle subsystems in accordance with the assigned classification. For example, the processor 125 may be programmed to generate and output command signals that command the vehicle subsystems to adjust one or more settings in accordance with the assigned classification. An example of such a vehicle subsystem may include, e.g., a control module such as the restraint control module, the body control module, etc. The command signals may indicate whether one or more airbags should be deployed, how to adjust the position of the side or rear view mirrors, the seat position, the steering wheel height, etc.

Figure 3:
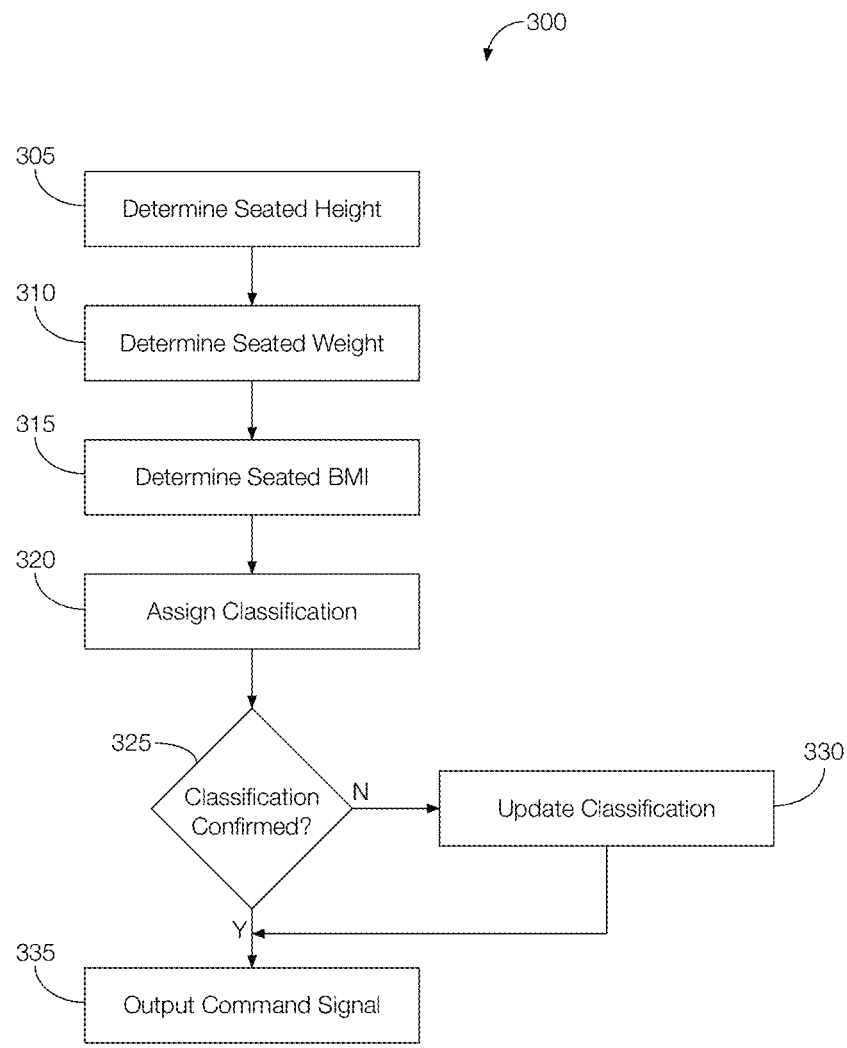
FIG. 3 is a flowchart of an example process that may be executed by the classification system of FIG. 1.

FIG. 3 is a flowchart of an example process 300 that may be executed by the occupant classification system 105 for classifying occupants according to the occupant's size without requiring the occupant to provide his or her height and weight.

At block 305, the occupant classification system 105 may determine the occupant's seated height. The seated height may be determined from, e.g., the seated height signal generated by the height sensor 115. Measuring the seated height may include the height sensor 115 determining a vertical height of the occupant while the occupant is seated, determining a seat angle (e.g., the angle of the seat back relative to the floor), and adjusting the vertical height according to the seat angle. The height sensor 115 may generate and output the seated height signal representing the adjusted seated height. The processor 125 may receive the seated height signal and determine the seated height of the occupant based on the seated height signal.

At block 310, the occupant classification system 105 may determine the occupant's seated weight. The seated weight may be determined from, e.g., the seated weight signal generated by the weight sensor 110. The weight sensor 110 may measure the occupant's seated weight and generated the seated weight signal accordingly. The processor 125 may receive the seated weight signal and determine the seated weight of the occupant based on the seated weight signal.

At block 315, the occupant classification system 105 may determine the seated BMI based on, e.g., a ratio of the seated weight to the seated height. For instance, the seated BMI may be a function of the ratio of the seated weight to the seated height squared as discussed above with respect to Equation (1). The processor 125 may determine the ratio.

At block 320, the occupant classification system 105 may assign a classification to the occupant based on the seated BMI determined at block 315. The classification may indicate that the occupant is underweight, at a normal weight, overweight, or obese. The processor 125 may assign the classification based on which classification is associated with the occupant's seated BMI determined at block 315. The classification may be selected from a table, database, etc., relating various seated BMI values to various classifications.

At decision block 325, the occupant classification system 105 may confirm the classification assigned at block 320. Confirming the classification may include, e.g., the processor 125 receiving the belt payout signal representing the amount of seatbelt payout. The processor 125 may determine that the occupant classification needs to be adjusted if, e.g., the amount of the seatbelt payout does not match the size of other occupant's with the same seated BMI as the present occupant. For example, for occupant's with athletic builds, the seatbelt payout may be low despite the occupant having a relatively high seated BMI. In this example, the seatbelt payout is inconsistent with the seated BMI. The processor 125 may confirm the classification if, e.g., the amount of the seatbelt payout is consistent with the size of other occupants with the same seated BMI as the present occupant. If the classification is not confirmed, the process 300 may proceed to block 330. If the classification is confirmed, the process 300 may proceed to block 335.

At block 330, the occupant classification system 105 may update the classification. For instance, the processor 125 may base the updated classification on the amount of the seatbelt payout as well as the ratio of the seated height to the seated weight. The updated classification may be selected form a table, database, etc., relating various seated BMI values, various seatbelt payout amounts, and various classifications. The process 300 may proceed to block 335.

At block 335, the occupant classification system 105 may generate and output a command signal to one or more vehicle subsystems. The command signal, which may be generated and output by the processor 125, may command the subsystem to adjust one or more settings in accordance with the assigned classification. Example vehicle subsystems may include, e.g., a control module such as the restraint control module, the body control module, etc. The command signals may indicate whether one or more airbags should be deployed, how to adjust the position of the side or rear view mirrors, the seat position, the steering wheel height, or the like.

The process 300 may end after block 335. In some instances, however, the process 300 may periodically begin again or return to a previous block, such as block 305, so that the classifications may be continually reevaluated and updated while the host vehicle 100 is operational.

Figure 4A:
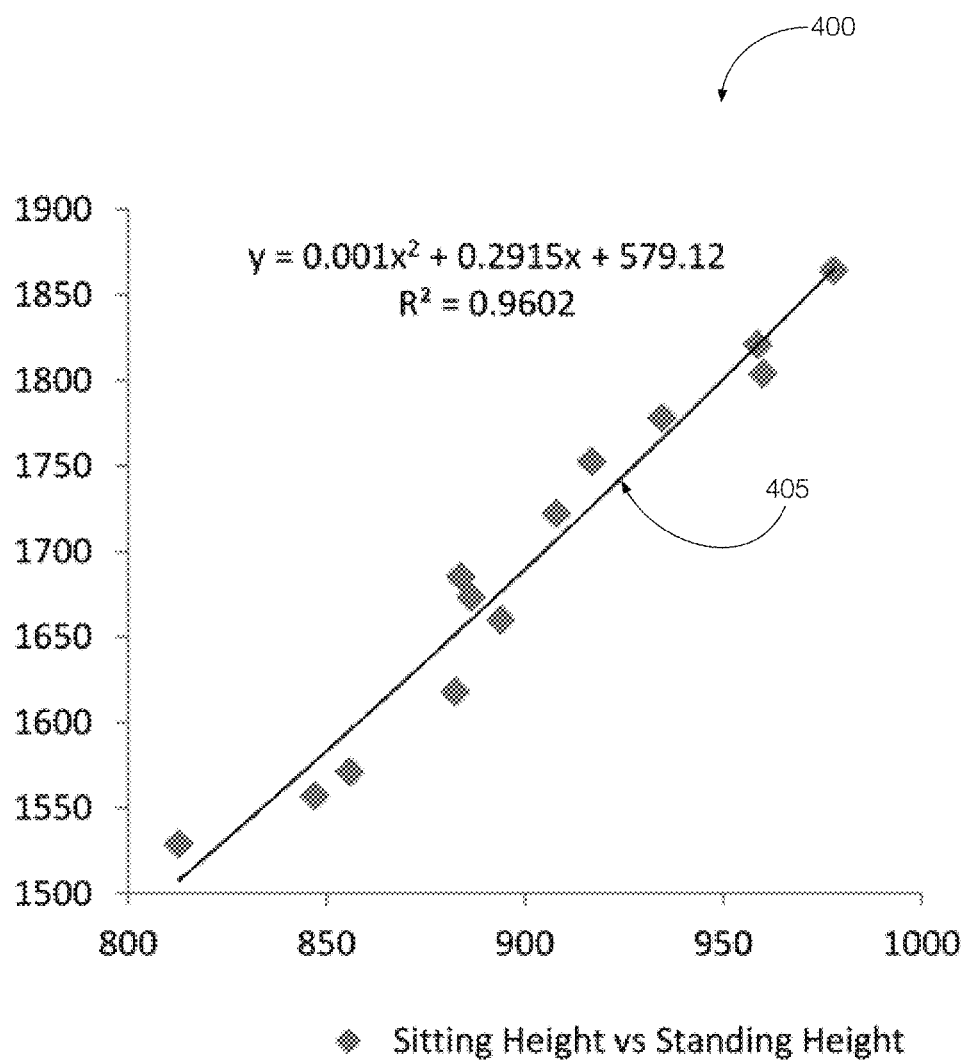
FIGS. 4A-4C are graphs showing example relationships between various metrics that may be used to classify occupants.
Figure 4B:
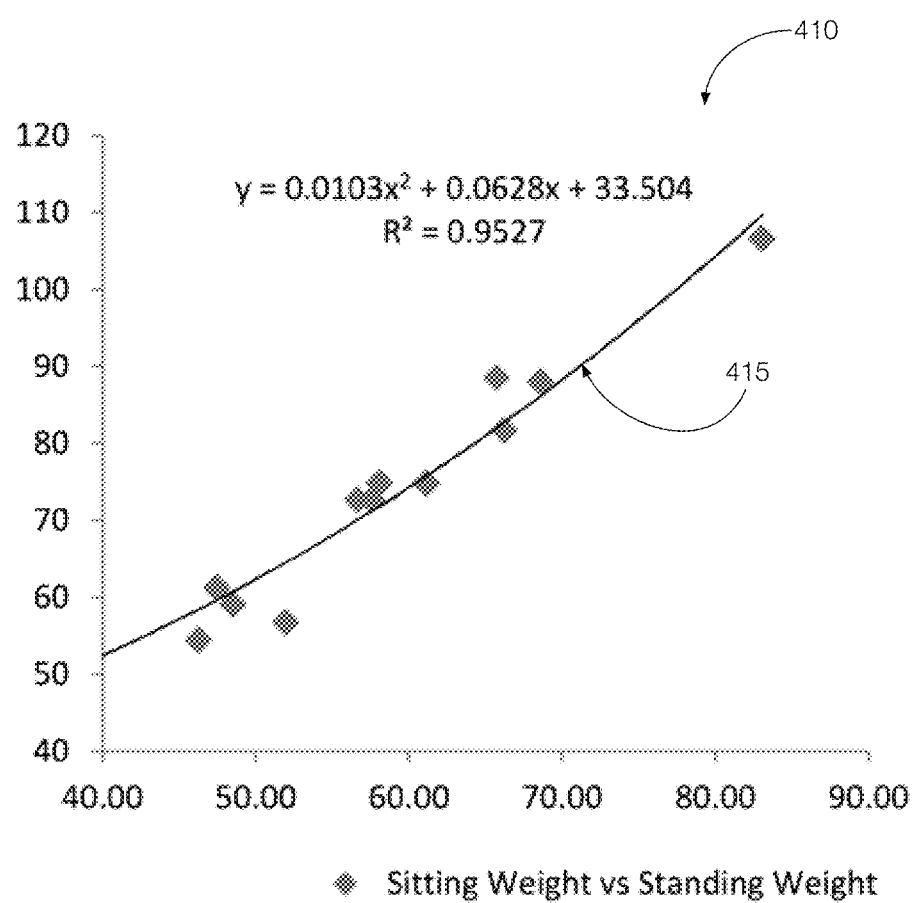
Figure 4C:
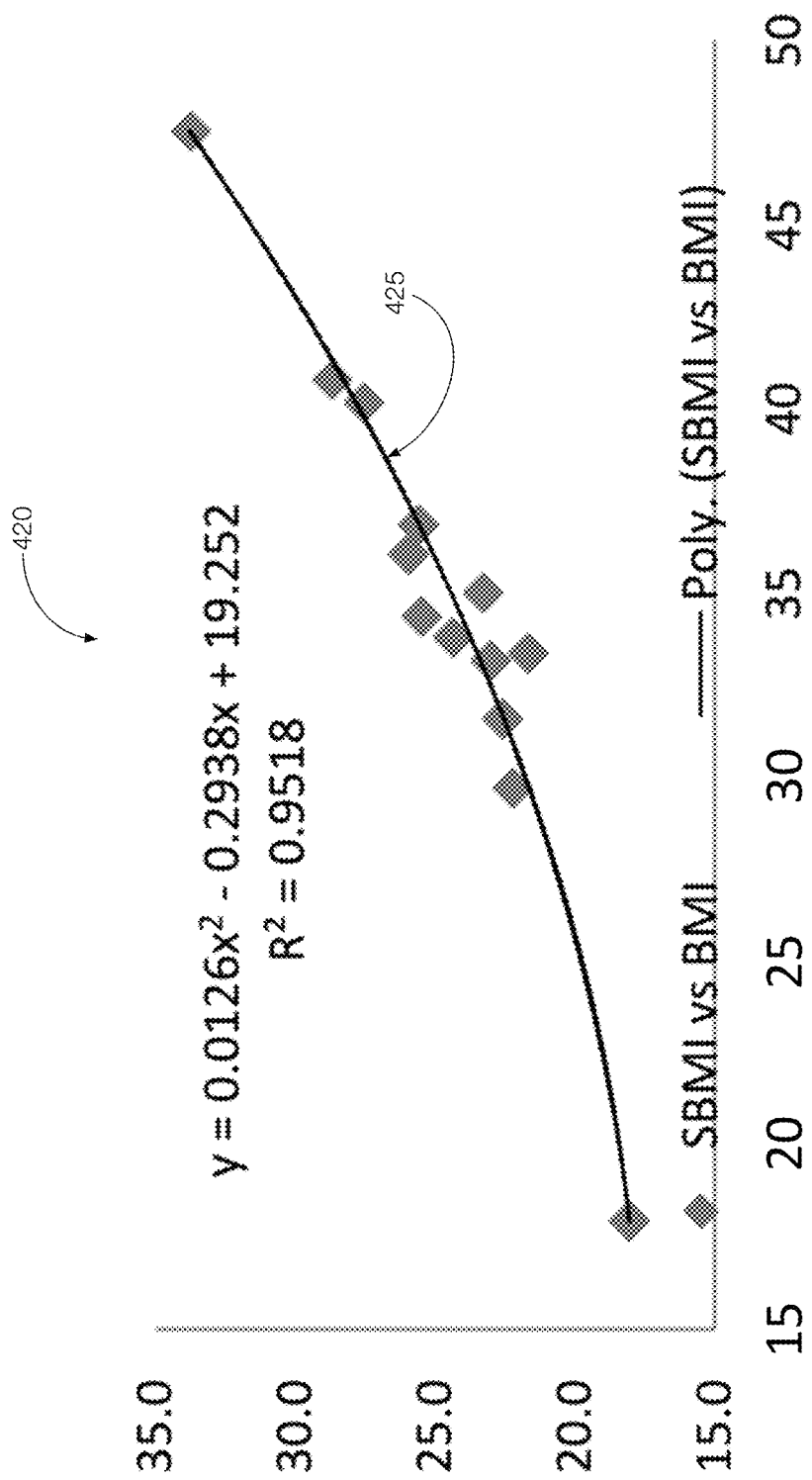

FIGS. 4A-4C are graphs showing example relationships between various metrics that may be used to classify occupants. FIG. 4A shows a graph 400 relating standing height (in millimeters) to seated height (in millimeters). The Y-axis represents standing height and the X-axis represents seated height. The trendline 405 illustrates an example parametric relationship between the standing height and the seated height. Referring now to FIG. 4B, the graph 410 relates standing weight (in kilograms) to seated weight (in kilograms). The Y-axis represents standing weight and the X-axis represents seated weight. The trendline 415 illustrates an example parametric relationship between the standing weight and the seated weight. FIG. 4C is a graph 420 relating seated BMI to standing BMI. The Y-axis represents standing BMI and the X-axis represents seated BMI calculated in accordance with, e.g., Equation (1). The trendline 425 illustrates an example parametric relationship between the standing BMI and the seated BMI. This relationship may be used to build a database, table, or other relationship relating occupant classifications, such as underweight, normal weight, overweight, and obese, to various seated BMI values based on established BMI classifications.

The occupant classification system 105, therefore, may use the traditional BMI classifications to classify a vehicle occupant according to his or her seated weight and seated height. By measuring the seated weight and seated height, the occupant classification system 105 can assign the classification without a user input providing such information. Alternatively, if such information is provided, the occupant classification system 105 may use the seated BMI to confirm the classification, or vice versa. Settings associated with various vehicle subsystems, such as the airbags, mirrors, etc., may be tuned according to the assigned classification.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a belt payout sensor programmed to output a belt payout signal representing a seatbelt payout;
   a processor programmed to determine a seated height and seated weight associated with a vehicle occupant, wherein the processor is programmed to assign a classification to the vehicle occupant based on the belt payout signal and a ratio of the seated weight to the seated height, wherein the seated height is a function of a vertical height and a seat angle.

2. The vehicle system of claim 1, further comprising a weight sensor programmed to measure the seated weight and output a seated weight signal, wherein the processor is programmed to determine the seated weight based at least in part on the seated weight signal.

3. The vehicle system of claim 1, further comprising a height sensor programmed to compensate for the seat angle.

4. The vehicle system of claim 3, wherein the height sensor is programmed to determine the vertical height of the vehicle occupant while the vehicle occupant is seated.

5. The vehicle system of claim 4, wherein the height sensor is programmed to determine the seated height based at least in part on the vertical height and the seat angle.

6. The vehicle system of claim 1, wherein the processor is programmed to output a command signal to a vehicle subsystem, wherein the command signal commands the vehicle subsystem to adjust at least one setting in accordance with the classification assigned to the vehicle occupant.

7. A method comprising:
   receiving a belt payout signal representing a seatbelt payout;
   determining a seated height of a vehicle occupant, wherein the seated height is a function of a vertical height and a seat angle;
   determining a seated weight of the vehicle occupant;
   determining a ratio of the seated weight to the seated height; and
   assigning a classification to the vehicle occupant based on the belt payout signal and the ratio of the seated weight to the seated height.

8. The method of claim 7, wherein determining the seated weight includes:
   receiving a seated weight signal representing a measured seated weight, and
   determining the seated weight based at least in part on the seated weight signal.

9. The method of claim 7, wherein determining the seated height includes compensating for the seat angle.

10. The method of claim 9, wherein determining the seated height includes determining the vertical height of the vehicle occupant while the vehicle occupant is seated.

11. The method of claim 10, wherein determining the seated height includes determining the seated height based at least in part on the vertical height and the seat angle.

12. The method of claim 7, wherein the processor is programmed to output a command signal to a vehicle subsystem, wherein the command signal commands the vehicle subsystem to adjust at least one setting in accordance with the classification assigned to the vehicle occupant.

13. A vehicle system comprising:
   a weight sensor programmed to measure a seated weight and output a seated weight signal representing the seated weight measured;
   a belt payout sensor programmed to determine a seatbelt payout and output a belt payout signal representing the seatbelt payout;
   a height sensor programmed to determine a seated height based at least in part on a vertical height of the vehicle occupant and a seat angle and output a seated height signal representing the seated height determined; and
   a processor programmed to determine the seated weight based at least in part on the seated weight signal and the seated height based at least in part on the seated height signal, wherein the processor is programmed to assign a classification to the vehicle occupant based at least in part on the seatbelt payout and a ratio of the seated weight to the seated height, wherein the seated height is a function of the vertical height and the seat angle.

14. The vehicle system of claim 13, wherein the processor is programmed to output a command signal to a vehicle subsystem, wherein the command signal commands the vehicle subsystem to adjust at least one setting in accordance with the classification assigned to the vehicle occupant.

15. The vehicle system of claim 1, wherein the ratio of the seated weight to the seated height is defined as the ratio of the seated weight to the seated height squared.

* * * * *